Jan. 3, 1967  B. H. HUMPHERYS  3,296,592
IFF AUTOMATIC ALARM
Filed May 29, 1963
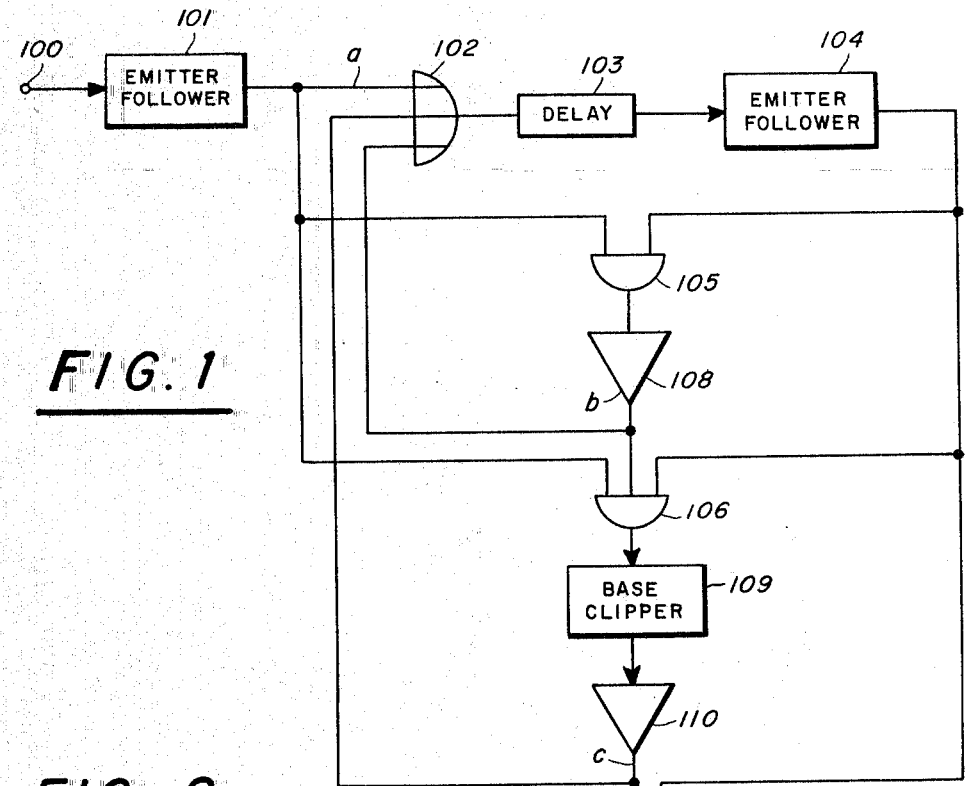
*FIG. 1*
*FIG. 2*
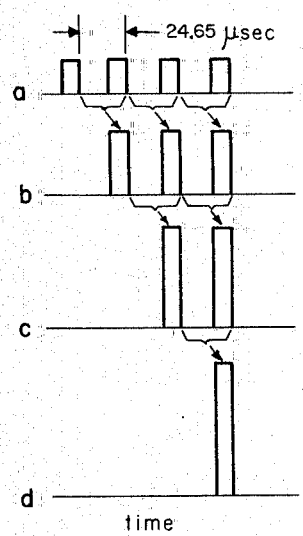
INVENTOR.
BERNARR H. HUMPHERYS
BY
*L. A. Miller*
*Roy Miller*
ATTORNEYS

United States Patent Office 3,296,592
Patented Jan. 3, 1967

3,296,592
IFF AUTOMATIC ALARM
Bernarr H. Humpherys, Escondido, Calif., assignor to the United States of America as represented by the Secretary of the Navy
Filed May 29, 1963, Ser. No. 284,268
2 Claims. (Cl. 340—167)

The invention described herein may be manufactured and used by or for the Government of the United States of America for governmental purposes without the payment of any royalties thereon or therefor.

The present invention relates to an emergency indicator alarm system and more particularly, to an improved emergency indicator alarm system incorporating standard low cost elements and specifically, to an improved IFF emergency indicator alarm.

The present invention relates to the application of radar and certain other echo ranging devices when the range indicator on the visual indicating means associated with such equipment is shortened to a lesser range than maximum for tracking and other purposes while the transmitter and receiver are still operating for target detection at the normal maximum range. This would be particularly true in IFF equipment which is associated with conventional radar. In emergency situations, a friendly target beyond the shorter range indicated on the face of the visual indicator may desire to make its presence known to the operator of the equipment. These emergency situations might arise if the target is disabled and needs assistance or if it is lost and desires to have a range and bearing transmitted to it.

Other attempts have been made to obviate the situation by having separate systems which utilize high cost extremely long 98.6 microseconds, lumped constant delay lines to decode emergency pulses which are then used to actuate an emergency alarm. Another system is known which incorporates a pulse counter which counts a certain number of pulses which in turn biases some type of alarm to an on position. The problem associated with such prior systems is the requirement for long delay lines which in turn imposes a restriction that the delay line be of a high quality in order to preserve the pulse information which, in turn, leads to the requirement that a line be used which is extremely expensive, if not impossible to procure. The problem incident to the use of the pulse counter is loss of accuracy due to not "anding" all possible start stop pulses.

An object of the present invention is to provide an indicating device for use with IFF systems to provide an indication to the operator of the system of the presence of a friendly target within the maximum range of the associated equipment.

A further object of the present invention is to provide an emergency alarm which utilizes low cost standard non-critical components.

Another object of the present invention is to provide an improved automatic IFF emergency alarm for use with existing radar and IFF systems for indicating to the operator of the equipment the presence of a friendly target within the maximum range of the equipment and beyond the range of the range indicated on a visual indicator.

Other objects and many of the attendant advantages of this invention will be readily appreciated as the same becomes better understood by reference to the following detailed description when considered in connection with th accompanying drawings wherein:

FIG. 1 is a block diagram of the proposed emergency alarm system and;

FIG. 2 is an illustration of pulses appearing at spaced points in the diagram of FIG. 1.

In the embodiment of FIG. 1 an input 100 receives defruited bracket decode pulses which are coupled as an input to an emitter follower 101. The output of emitter follower 101 is then buffered through an OR gate 102 as an input to a 24.65 microsecond delay line 103. The delay line 103 may be a very low cost one i.e. such as a distributed capacity line rather than the more expensive lumped constant type even if a line 98.6 microseconds with the necessary fidelity could be obtained. The output of delay line is coupled as the input to an emitter follower 104 the output of which forms one input to an AND gate 105.

The other input to AND gate 105 comprises an output from the emitter follower 101. The output of AND gate 105 is connected through an amplifier 108 as one input to another AND gate 106. Other inputs to AND gate 106 comprises the output of emitter follower 104 and the output of emitter follower 101.

The output of AND gate 106 is coupled through a base clipper 109 and amplifier 110 as one input to an AND gate 107. The other input to AND gate 107 comprises the output of emitter follower 104.

The output of AND gate 107 is coupled to a base clipper 111 where base clipping is performed and then through an emitter follower 112; to a silicon-controlled rectifier 113; and to an alarm 114. The alarm is energized by a source of A.C. potential 115 which is connected at one side to ground.

In addition, other inputs are coupled to OR gate 102 from the outputs of amplifiers 108 and 110.

FIG. 2 illustrates the pulses which appear at points $a$, $b$, $c$ and $d$ in FIG. 1. For instance, the four pulses corresponding to four bracket decoded start stop pulses in an emergency IFF pulse train which are spaced 24.65 microseconds apart would appear, at point $a$. At point $b$ three pulses of a higher amplitude would appear. At point $c$, after a further coincidizing in AND gate 106, two pulses would be present at a higher amplitude than at point $b$ and at point $d$, after coincidizing in AND gate 107, a single pulse would appear which would be of a sufficient amplitude to trigger the alarm 114.

OPERATION

In operation, the incoming defruited bracket pulses are coupled into delay line 103 and appear at the input to AND gate 105 as shown in line $a$ of FIG. 2. The output of amplifier 108 consists of three pulses of a greater amplitude than those of line $a$ as shown in line $b$ of FIG. 2. Due to the 24.65 microsecond delay of delay line 103 only the last three pulses in line 103 will be coincidized in AND gate 105 i.e. the first and second; second and third; and third and fourth will be coincidized.

The output of amplifier 108 is coupled back through line 103 at a higher amplitude than at line "$a$" of FIG. 2 and due to the anding in AND gate 106 two pulses of high amplitude and one pulse of low amplitude appear at the input to base clipper 109. It is to be understood that at the output of AND gate 105 there would be three pulses of high amplitude as shown in line $b$ and one pulse of extremely small amplitude which is assumed to be effectively removed in the coincidizing process. The level of the clipper 109 is adjusted to remove the low amplitude pulse at the output of the AND gate 106 and the output of amplifier 110 appears as shown in line $c$ of FIG. 2. These are also fed back to the input line 103 at a higher level than the previous three pulses at $b$. The output of AND gate 107 after base clipping, to remove any low level pulses, appears as shown in line $d$, which is used to bias "on" the silicon-controlled rectifier 113 which allows alarm 114 to be activated. The A.C. source is used to turn off the rectifier 115 until another alarm appears at the output of base clipper 111.

The input to AND gate 106 from the output of the emitter follower 101 is used to prevent regeneration in the circuit when no pulses are present at *a*. Even though only double coincidizing is needed, theoretically, the triple coincidizing is utilized to prevent the regenerative aspect of the system.

The system disclosed utilizes off the shelf components which are low priced, easily maintained and easily procurable. No critical adjustments are required in the system nor is there any need for extremely long accurate delay lines for storing, for example, four start stop pulses as is necessary in the prior systems. The present system attains the same end as the system utilizing one long line without the cost.

Obviously many modifications and variations of the present invention are possible in the light of the above teachings. It is, therefore, to be understood that within the scope of the appended claims the invention may be practiced otherwise than as specifically described.

What is claimed is:

1. A system for detecting receipt of four serial pulses each spaced from each other by a predetermined time interval comprising;
    a source of serial pulses to be detected,
    delay means having an input and an output and adapted to produce pulses at its output indicative of pulses at its input delayed by said time interval,
    means for supplying pulses from said source to said delay means input,
    first coincidence detecting means having two inputs and an output and adapted to produce a signal at its output when signals are present at its two inputs,
    one of said first coincidence detecting means inputs being connected to receive pulses from said source and the other of said inputs being coupled to said delay means output,
    a first amplifier for receiving signals from said first coincidence detecting means output and producing an output representative of said received signals increased in amplitude,
    second coincidence detecting means having three inputs and an output and adapted to produce a signal at its output when signals are present at its three inputs,
    one of said second coincidence detecting means inputs being connected to receive increased amplitude signals from said first amplifier output,
    the others of said second coincidence detecting means inputs being connected to receive pulses from said source and pulses from said delay means output respectively,
    a second amplifier having an input and an output and adapted to produce signals at its output representative of signals at its input increased in amplitude,
    a first clipper serially connected between said second coincidence detecting means output and said second amplifier input and adapted to pass signals from said second coincidence detecting means output to said second amplifier input only when such signals exceed a predetermined amplitude,
    third coincidence detecting means having two inputs and an output and adapted to produce a signal at its output when signals are present at its two inputs,
    one of said third coincidence detecting means inputs being connected to said second amplifier output and the other to said delay means output,
    each one of said first amplifier output and said second amplifier output also being arranged to supply their respective output signals to said delay means input,
    alarm means having an input and responsive to signals at its input for producing an alarm indication,
    a second clipper serially connected between said third coincidence detecting means output and said alarm means input and adapted to pass signals from said third coincidence detecting means output to said alarm means input only when such signals exceed a predetermined amplitude,
    whereby receipt of four serial pulses of proper time spacing will cause said alarm to produce an alarm indication.

2. The system of claim 1 wherein said four serial pulses are an alarm signal from an associated IFF radar system.

References Cited by the Examiner

UNITED STATES PATENTS 2,984,789   5/1961   O'Brien _____ 340—167 X

NEIL C. READ, *Primary Examiner.*

P. XIARHOS, D. YUSKO, *Assistant Examiners.*